No. 778,948. PATENTED JAN. 3, 1905.
C. H. BRYAN.
RUBBER TIRE.
APPLICATION FILED MAR. 3, 1904.
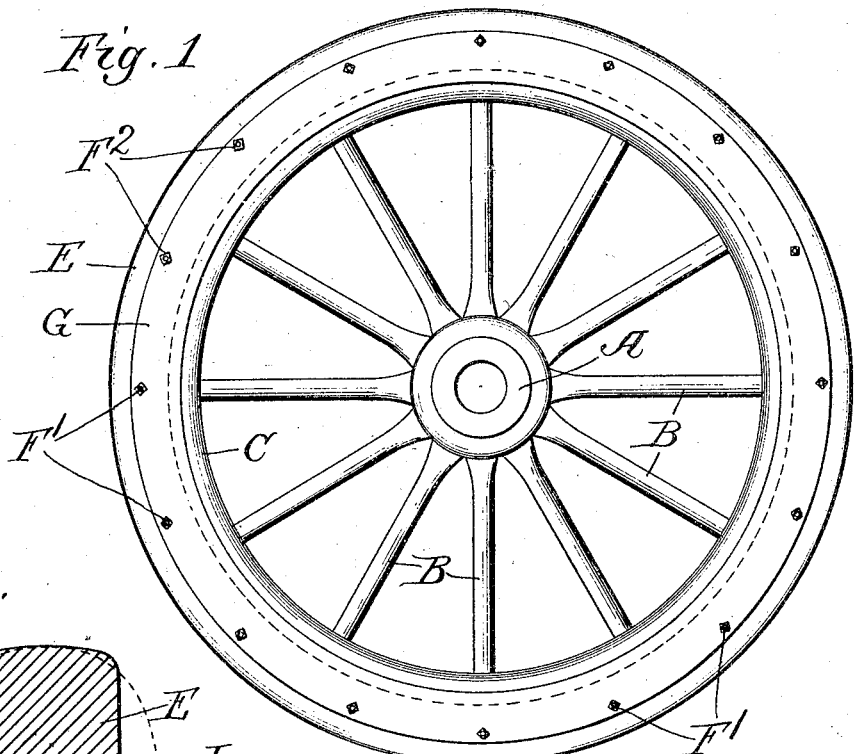
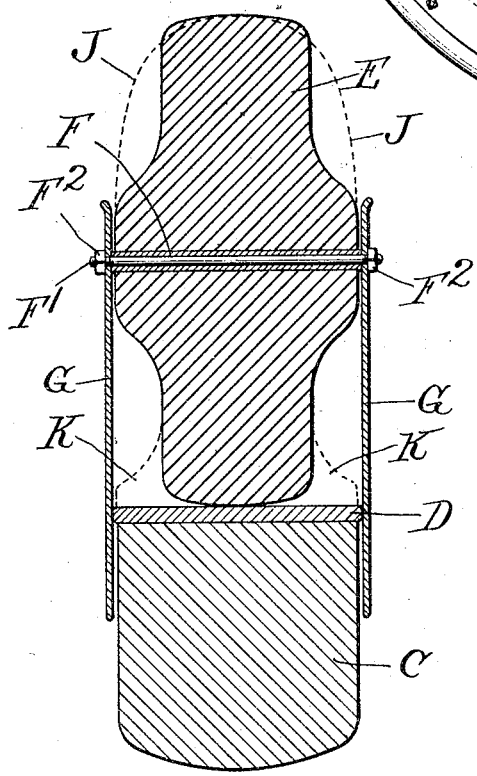
Witnesses.
Edward T. Wray
Homer L. Kraft
Inventor
Clarence H. Bryan
by Parker Carter
Attorney's No. 778,948. Patented January 3, 1905.

UNITED STATES PATENT OFFICE.

CLARENCE H. BRYAN, OF CHICAGO, ILLINOIS.

RUBBER TIRE.

SPECIFICATION forming part of Letters Patent No. 778,948, dated January 3, 1905.

Application filed March 3, 1904. Serial No. 196,416.

*To all whom it may concern:*

Be it known that I, CLARENCE H. BRYAN, a citizen of the United States, residing at Chicago, in the county of Cook and State of Illinois, have invented a certain new and useful Improvement in Rubber Tires, of which the following is a specification.

My invention relates to tires of rubber or other elastic material for vehicle-wheels, and has for its object to provide a new and improved construction for such devices.

One form of my invention as applied to a wheel of ordinary construction is shown in the accompanying drawings, wherein—

Figure 1 represents a side view of the wheel and tire; Fig. 2, a cross-section of the felly and tire on a radial line of the wheel.

Like parts are indicated by the same letter in both figures.

A represents the hub of the wheel; B, the spokes; C, the felly, of wood or other material, having preferably attached to it on its outer perimeter the iron or steel hoop D.

E is the tire, which I make of rubber and in form and proportions substantially as shown in the drawings—that is, its width at the widest part, which is half-way between the inner circumference and the tread, is approximately the width of the wheel-felly C. Its thickness from inner to outer circumference I make about double that distance. From its widest part it narrows toward the tread rather rapidly at first and thereafter more gradually, as shown in Fig. 2. The curve at the tread is somewhat flattened. The part of the tire inward of its widest part toward the felly is symmetrical with that part already described.

While I have thus in some detail shown the particular form and specific proportions of the tire which I prefer to use, it will be clear that both the shape and proportions may be greatly varied without in any way departing from the spirit of my invention, and therefore I do not confine myself to the particular form shown and described. The material likewise may be of any sort that will give the desired elasticity. The tire is given such a diameter that when adjusted to the wheel it will normally press with some firmness against the hoop D throughout its zone of contact therewith. Through the widest part of the tire, at intervals of about six or eight inches, are horizontal perforations which receive the metal tubes F, securely fastened therein by vulcanizing or other method. Through the tubes F and extending for a short distance beyond the tire on each side of it are the bolts F', closely fitting the tubes F and threaded on each end. The bolts F' likewise pass through perforations in the flanges G. The nuts F² on the bolts F' securely fasten together the tire and the flanges. The flanges G, which are annular metal pieces, extend on either side of the tire for some distance inward against and along the sides of the felly C and are preferably curved in opposite directions away from the tire E at their outer circumferences.

In Fig. 2 I have shown in dotted lines J J a different form for the outer portion of the elastic tire and at K K a different form for the inner portion of such elastic tire. It is possible that this last is the preferred form of my device, although my experience has not yet been sufficient to demonstrate what is the best tire-section to use.

The use and operation of my invention are as follows: The tire E is fitted to the rim of the wheel and normally contacts somewhat closely with the hoop or band D, so as to prevent slipping. When the vehicle is loaded, the area of contact of the tire E and the hoop D, due to the peculiar form of my tire, is greatly increased, and consequently the grip of these parts one upon the other is strengthened. By using this form of tire and the peculiar method described of attaching it to the wheel I also get a very high degree of elasticity. By giving the wide part of the tire a movable support with respect to the wheel-rim and then narrowing the tire toward its inner circumference, so that it has a comparatively narrow zone of contact with the wheel-rim, it is clear that the resiliency of the tire will be greatly increased in comparison with tires solidly attached to their rims at the wide portion of such tires. Obviously I get almost double the amount of elasticity that I should get were the tire fixedly attached to a stationary rim at the place where it is pierced for the bolts F'. The tubes F and bolts F' at frequent intervals prevent the tire from collapsing under a heavy load, and thus permit the use of a tire comparatively narrow from side to side and comparatively thick from the wheel-rim to the tread, and this means a great gain in elasticity. The flanges G hold the tire from slipping sidewise off the rim, thus obviating the necessity for using a concaved inclosing rim. It also does away with cementing. Both the use of concaved rims and cementing cause a loss of resiliency.

It is to be understood that while I have described a particular construction embodying my invention the construction, shape, and arrangement of the parts admit of a wide variance without any departure from the broad scope of my invention, and therefore I do not limit myself to the particular forms and constructions set forth.

I wish to point out particularly that by this structure I get a very deep tire—that is, deep relative to its width or thickness. The inclosing members, since they are movable on the wheel, move with the tire, and therefore the entire cage-like structure carrying the tire is movable along radii of the wheel. It may also, of course, to a certain extent creep or travel around the wheel. The tire is reduced, as indicated, in its inner portion—that is, between the point of its attachment to the guiding members or flange-like annuli—in part, so that in this inclosed chamber it may have room for compression. The flanges, secured together near their outer edges by the cross-rods or bolts which pass through the tire, are held firmly.

I claim—

1. The combination of an elastic tire having its inner face convex with a wheel having a substantially flat rim, and means for holding the tire from slipping laterally off the rim, such means comprising guiding members fixedly attached to the tire, and associated with the wheel by a movable connection.

2. The combination of a vehicle-wheel having a substantially flat rim with an elastic tire relatively narrow at the place of its contact with the rim, and means for holding the tire in position on the rim, such means comprising guiding members fixedly attached to the tire, and associated with the wheel by a movable connection.

3. An elastic tire for vehicles relatively narrow near its inner and outer circumferences, relatively wide at the place therebetween, and a movable device associated with such wide portion for holding the tire in position on the wheel, such device comprising guiding members fixedly connected with the tire, and associated with the wheel by a movable connection.

4. The combination of a wheel having a substantially flat rim with an elastic tire substantially as wide at its widest part as the wheel-rim and narrowing from its widest part toward the tread and toward its inner circumference, rapidly at first and thereafter more gradually, and somewhat flattened at its inner and outer circumferences, substantially as described, and means for holding the tire in position on the rim, such means rigidly connected with the tire at its widest part, and having a movable connection with the wheel-rim.

5. The combination of an elastic tire with a wheel on whose rim it is placed, and means for holding the tire from slipping laterally off the rim, said means comprising guiding members fixedly attached to the tire and associated with the wheel by a movable connection.

6. The combination of a vehicle-wheel with an elastic tire thereabout, means for holding the tire in position on the rim, such means comprising guiding members fixedly attached to the tire and associated with the wheel by a movable connection, the inner portion of the tire reduced in cross-section so as to give opportunity for compression between such guiding members.

7. The combination of a wheel with an elastic tire thereabout and adapted to rest upon the rim thereof, holding devices which inclose the rim of the wheel and a portion of the tire and which are free to move on the wheel, and connections between the holding devices and the tire.

8. The combination of a wheel with an elastic tire thereabout and adapted to rest upon the rim thereof, holding devices which inclose the rim of the wheel and a portion of the tire and which are free to move on the wheel, and connections between the holding devices and the tire, said connections about midway the thickness of the tire measured on radial lines drawn from the center of the wheel.

9. The combination of a wheel with an annular cage-like structure comprising two parts which overhang the sides of the rim of the wheel and cross-pieces which hold these parts together, and an elastic tire secured in the cage-like structure and adapted to bear on the outer rim of the wheel.

10. The combination of a wheel with an annular cage-like structure comprising two annular flanges which overhang the sides of the rim of the wheel and cross-rods which hold these parts together, and an elastic tire secured on the cross-rods between the flanges in the cage-like structure and adapted to bear on the outer rim of the wheel.

CLARENCE H. BRYAN.

Witnesses:
HOMER L. KRAFT,
ANSON B. SWEET.